United States Patent
Alberti et al.

(10) Patent No.: US 10,860,532 B2
(45) Date of Patent: *Dec. 8, 2020

(54) SHARING OF SNAPSHOTS AMONG MULTIPLE COMPUTING MACHINES

(71) Applicant: International Business Machines Corporation, Armonk, NY (US)

(72) Inventors: Enrica Alberti, Rome (IT); Gianluca Mariani, Rome (IT); Antonio Secomandi, Rome (IT); Michele Tomassi, Rome (IT); Viviana Tripodi, Rome (IT)

(73) Assignee: International Business Machines Corporation, Armonk, NY (US)

(*) Notice: Subject to any disclaimer, the term of this patent is extended or adjusted under 35 U.S.C. 154(b) by 357 days.

This patent is subject to a terminal disclaimer.

(21) Appl. No.: 15/807,635

(22) Filed: Nov. 9, 2017

(65) Prior Publication Data

US 2018/0081891 A1    Mar. 22, 2018

Related U.S. Application Data

(63) Continuation of application No. 14/507,991, filed on Oct. 7, 2014, now Pat. No. 9,934,226.

(30) Foreign Application Priority Data

Nov. 7, 2013    (GB) .................................. 1319679.5

(51) Int. Cl.
*G06F 16/11*    (2019.01)
*G06F 8/61*    (2018.01)
*G06F 9/455*    (2018.01)

(52) U.S. Cl.
CPC .............. *G06F 16/128* (2019.01); *G06F 8/63* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| 7,730,033 B2 | 6/2010 | Mohamed |
| 7,743,031 B1 | 6/2010 | Cameron et al. |

(Continued)

FOREIGN PATENT DOCUMENTS

WO    WO2005111773 A2    11/2005

OTHER PUBLICATIONS

Notice of Allowance, dated Nov. 22, 2017, regarding U.S. Appl. No. 14/507,991, 19 pages.

(Continued)

*Primary Examiner* — Hau H Hoang
*Assistant Examiner* — Hau Hoang
(74) *Attorney, Agent, or Firm* — Yee & Associates, P.C.

(57) ABSTRACT

A solution is proposed for managing each one of a plurality of computing machines. A corresponding method comprises taking one or more snapshots of the computing machine or part thereof, the snapshots being organized in a snapshot tree of nodes representing the snapshots according to a dependency thereof, expanding the snapshot tree of the computing machine according to each sub-tree of the snapshot tree of each other computing machine having the snapshot of a parent node of the sub-tree matching a graft node of the snapshot tree of the computing machine, the sub-tree being appended to the graft node, selecting a snapshot of the other computing machines represented by a selected node of the snapshot tree of the computing machine, and restoring the selected snapshot on the computing machine.

14 Claims, 7 Drawing Sheets

(56) References Cited

U.S. PATENT DOCUMENTS

| | | |
|---|---|---|
| 7,822,711 B1 | 10/2010 | Ranade |
| 8,135,930 B1 | 3/2012 | Mattox et al. |
| 8,307,177 B2 | 11/2012 | Prahlad et al. |
| 8,364,639 B1 | 1/2013 | Koryakina et al. |
| 8,365,167 B2 | 1/2013 | Beaty et al. |
| 8,458,695 B2 | 6/2013 | Fitzgerald et al. |
| 2008/0183973 A1 | 7/2008 | Aguilera et al. |
| 2008/0320258 A1 | 12/2008 | Wayda et al. |
| 2010/0293144 A1 | 11/2010 | Bonnett |
| 2012/0284232 A1 | 11/2012 | Fiske |
| 2012/0323853 A1 | 12/2012 | Fries et al. |
| 2013/0024940 A1 | 1/2013 | Hutchins et al. |
| 2013/0219118 A1 | 8/2013 | Beeken |
| 2014/0129521 A1 | 5/2014 | Marsden |
| 2014/0258238 A1* | 9/2014 | Jin ................. G06F 9/45558 707/649 |
| 2015/0127618 A1 | 5/2015 | Alberti et al. |

OTHER PUBLICATIONS

"Distributed Virtual Image Tree Hierarchy Storage within a Cloud," IBM Corporation, IP.com Prior Art Database Technical Disclosure No. IPCOM000190317D, Nov. 23, 2009, 4 pages.

"Using Snapshots to Manage Virtual Machines," vSphere Virtual Machine Administration, Update 1, ESXi 5.0, vCenter Server 5.0, VMware, Inc., copyright 2009-2012, pp. 207-220.

Yu et al., "SNPdisk: An Efficient Para-Virtualization Snapshot Mechanism for Virtual Disks in Private Clouds," IEEE Network, vol. 25, No. 4, Jul. 2011, pp. 20-26.

Erikw "DeepIntro to Vmware, Part 8: Snapshot", Symantec Corporation, Jul. 28, 2009, 6 pages. https://www.symantec.com/connect!articles/readydeep-introvmware-part-8-snapshot.

"Oracle Solaris ZFS Administration Guide", Oracle Corporation, Accessed May 16, 2017, 2 pages.

Office Action, dated Jul. 14, 2017, regarding U.S. Appl. No. 14/507,991, 26 pages.

* cited by examiner

SHARING OF SNAPSHOTS AMONG MULTIPLE COMPUTING MACHINES

CROSS REFERENCE TO RELATED APPLICATIONS

This application claims the benefit of priority to United Kingdom Patent Application No. 1319679.5, filed Nov. 7, 2013, the contents of which are incorporated herein by reference.

DESCRIPTION

Technical Field

The present disclosure relates to the information technology field. More specifically, this disclosure relates to the management of snapshots.

Background

Snapshots are commonly used to save representations of a state of a computing machine at particular points in time. For example, the snapshots are very useful in a software development environment, wherein the computing machine is used to write and test new software programs (comprising new versions and patches thereof). In this case, a software developer may move back and forth along the snapshots; for example, this allows testing a new feature in different versions of the software development environment (such as with different levels of an operating system and/or software development tools).

Generally, a complex software development process involves a software development team comprising a high number of software developers; the software developers work concurrently on different aspects of the software development process, by using corresponding computing machines.

Particularly, in a virtualized computing system, each software developer is assigned a virtual (computing) machine (VM)—i.e., emulation by software of a physical computing machine. In this case, the software development environment may be installed and configured on a reference virtual machine; the reference virtual machine may then be cloned into any number of identical virtual machines for the software developers in a very simple and fast way (so as to avoid the need of repeating the operations required for the installation and configuration of the software development environment).

Moreover, as disclosed in U.S. Pat. No. 8,364,639 (the entire disclosure of which is herein incorporated by reference), a centralized integrated backup may be created for the virtual machines. The snapshots taken at various times on each virtual machine are combined into a corresponding chronological tree viewable via a viewer; users are allowed to roll-back to any previous version of their virtual machine and instantiate this version using a logic encapsulated in a corresponding snapshot.

The virtual machines of the different software developers (even if cloned from the same reference virtual machine) are completely independent one to another. Therefore, each software developer installs and configures any required new version of the software development environment on the corresponding virtual machine manually, and s/he takes corresponding snapshots thereof. However, this requires the repetition on the different virtual machines of similar operations that are quite time consuming; moreover, this causes a sprawling of the snapshots (relating to similar versions of the software development environment) on the different virtual machines, with a corresponding waste of mass memory space.

Sometimes, a specific version of the software development environment that is required on the (target) virtual machine of a software developer may have already been installed on the (source) virtual machine of another software developer. In this case, it might be possible to clone the source virtual machine with the desired version of the software development environment into the target virtual machine.

This process generally requires stopping the source virtual machine, taking a snapshot of its current version of the software development environment, restoring the snapshot corresponding to the required version of the software development environment, capturing a software image thereof (i.e., a structure encapsulating a content of its mass memory), and then restoring the snapshot of the current version of the software development environment. However, this involves a long period of unavailability of the source virtual machine. Moreover, the process requires saving selected data of the target virtual machine (for example, specific modules of the software program under test assigned to its software developer, results of previous tests), stopping the target virtual machine, attaching the software image of the source virtual machine thereto, and booting the target virtual machine from this software image; the target virtual machine is then re-configured for its correct operation (for example, by changing IP address and hostname) and for applying any desired customization (for example, user name, desktop appearance), and the saved data is restored. However, the above-mentioned operations are quite time consuming and prone to errors; moreover, the cloning of the source virtual machine into the target virtual machine may cause the loss of any previous snapshots of the latter.

SUMMARY

A simplified summary of the present disclosure is herein presented in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In general terms, the present disclosure is based on the idea of sharing the snapshots among multiple computing machines.

Particularly, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

More specifically, an aspect provides a method for managing each one of a plurality of computing machines, wherein a snapshot tree representing one or more snapshots of the computing machine (or part thereof) is expanded according to each matching sub-tree of the snapshot tree of the other computing machines for allowing restoring the snapshot of any selected node of the expanded snapshot tree on the computing machine.

A further aspect provides a corresponding computer program (and a corresponding computer program product).

A further aspect provides a corresponding system.

BRIEF DESCRIPTION OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
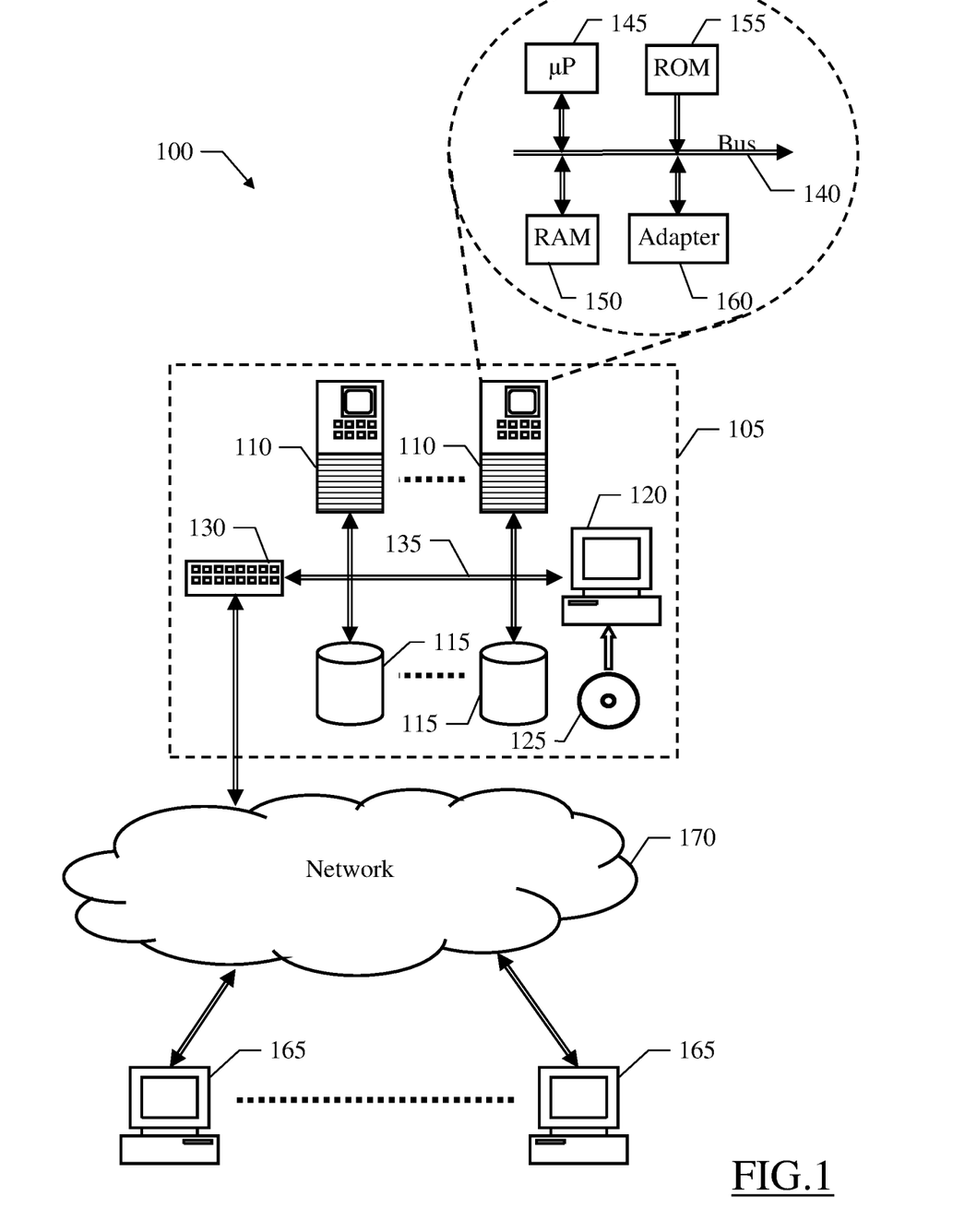
FIG. 1 shows a schematic block-diagram of a computing system wherein the solution according to an embodiment of the present disclosure may be applied.

With reference in particular to the FIG. 1, a schematic block-diagram is shown of a computing system 100 wherein the solution according to an embodiment of the present disclosure may be applied.

The computing system 100 comprises a data center 105 with several server computing machines, or simply servers, 110 (for example, of the rack or blade type) and storage disks 115 (for example, of the RAID type) implementing mass-memories thereof; the data center 105 also comprises a console 120 for controlling the servers 110 and the disks 115 (for example, a personal computer, also provided with a drive for reading DVD- or CD-ROMs 125). A switch/router sub-system 130 manages any communications among the servers 110, the disks 115 and the console 120; for this purposes, the servers 110, the disks 115 and the console 120 are connected to the switch/router sub-system 130 through a cabling sub-system 135.

A generic server 110 comprises several units that are connected in parallel to a bus structure 140. In detail, one or more microprocessors (μP) 145 control operation of the server 110; a RAM 150 is directly used as a working memory by the microprocessors 145, and a ROM 155 stores basic code for a bootstrap of the server 110. Moreover, the server 110 comprises a network adapter 160, which is used to connect the server 110 to the cabling sub-system 135.

The data center 105 provides services to several client computing machines (or simply clients) 165. For this purpose, the clients 105 access the data center 105 via a network 170 (for example, a private LAN), to which the data center 105 is connected through the switch/router sub-system 130. For example, software developers of a software development team may use their clients 165 to run corresponding virtual machines that are hosted on the servers 110.

With reference now to the FIG. 2A-FIG. 2D, a pictorial representation is shown of an exemplary application of the solution according to an embodiment of the present disclosure.

Figure 2A:
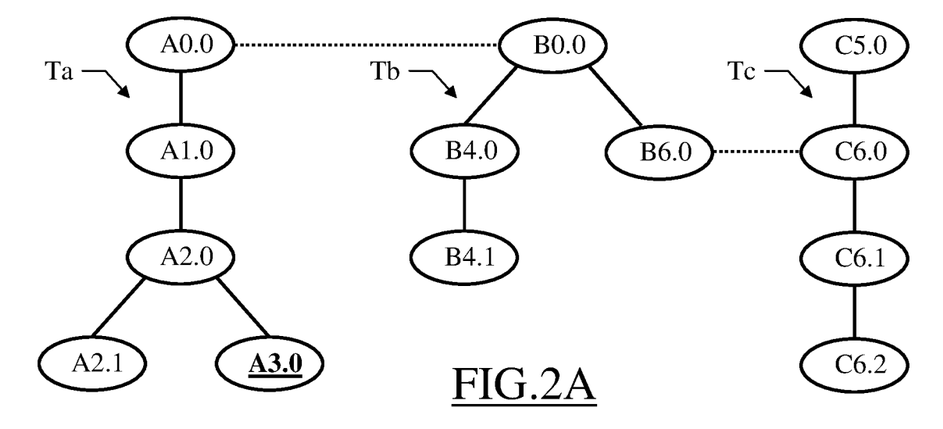
FIG. 2A-FIG. 2D show a pictorial representation of an exemplary application of the solution according to an embodiment of the present disclosure.

Starting from the FIG. 2A, one or more snapshots are taken of each virtual machine (or a part thereof) over time; each snapshot saves a representation of a state of the corresponding virtual machine at a particular point in time (for example, its configuration and memory content). The snapshots of each virtual machine are organized in a snapshot tree. Generally, a tree is a graph (i.e., a representation of objects by nodes with some pairs thereof linked by edges) with at most a single edge between each pair of nodes; particularly, in a rooted tree one of the nodes is designated to be a root node, with all the edges that are oriented towards or away from it. Each node in any path (i.e., a sequence of adjacent edges) from a specific node away from the root node is a descendent node that depends on it (with any node having no descent node that is called a leaf node); vice-versa, each node in a path from a specific node to the root node is an ancestor node of it (with the root node that has no ancestor node). Particularly, each first descendent node directly linked to a specific node is a child node thereof, and the first ancestor node directly linked to a specific node is a parent node thereof. The rooted tree (or simply tree) comprises one or more sub-trees, each one defined by any node thereof with all its descendent nodes. In this specific context, the nodes of each snapshot tree represent the snapshots of the corresponding virtual machine, which are organized according to their dependencies. For example, the snapshot of the root node is full (i.e., it saves the complete representation of the corresponding state of the virtual machine); the snapshot of each descendent node (different from the root node) is instead incremental with respect to the snapshot of its parent node (i.e., it only saves the representation of the differences of the corresponding state of the virtual machine with respect to the one of the parent node).

In the example at issue, the snapshot trees of three virtual machines VMa, VMb and VMc (denoted with Ta, Tb and Tc, respectively) are shown; each node of the snapshot trees Ta, Tb and Tc represents a snapshot of the corresponding virtual machine VMa, VMb and VMc, respectively, for a different version of a software development environment installed thereon (as indicated by the letter A, B and C, respectively, followed by a corresponding version number). Particularly, the snapshot tree Ta comprises a (root) node A0.0, a node A1.0 dependent thereon, a node A2.0 dependent thereon, and two (leaf) nodes A2.1 and A3.0 dependent thereon. For example, it is possible that starting from the version 0.0, the software development environment has been upgraded in succession to the versions 1.0, 2.0 and 2.1, returned to the version 2.0, and then upgraded to the version 3.0. Moreover, the snapshot tree Tb comprises a (root) node B0.0, a node B4.0 dependent thereon and a (leaf) node B4.1 dependent thereon, and a (leaf) node B6.0 dependent on the node B0.0 (for example, with the software development environment that starting from the version 0.0 has been upgraded in succession directly to the versions 4.0 and 4.1, returned to the version 0.0, and then upgraded directly to the version 6.0). At the end, the snapshot tree Tc comprises a (root) node C5.0, a node C6.0 dependent thereon, a node C6.1 dependent thereon and a (leaf) node C6.2 dependent thereon (for example, with the software development environment that starting directly from the version 5.0 has been upgraded in succession to the versions 6.0, 6.1 and 6.2).

In the solution according to an embodiment of the present disclosure, the snapshots are shared among the virtual machines VMa-VMc. For this purpose, each snapshot tree (for example, the snapshot tree Ta) is expanded according to a matching of the snapshots actually taken on its virtual machine VMa (referred to as local snapshots) and the snapshots of the other virtual machines VMb,VMc (referred to as shared snapshots), as indicated with dotted lines in the figure. In the example at issue, the snapshot of the node B0.0 matches the snapshot of the node A0.0 (for example, because the node A0.0 represents a cloning of the virtual machine VMa from the snapshot of the node B0.0); moreover, the snapshot of the node C6.0 matches the snapshot of the node B6.0 (for example, because they have been linked manually after determining their common version of the software development environment).

More specifically, the snapshot tree Ta is expanded according to each sub-tree of the other snapshot trees Tb,Tc, which sub-tree has the snapshot of the parent node thereof in its snapshot tree Tb,Tc that matches the snapshot of a (graft) node of the snapshot tree Ta. In the example at issue, the snapshot tree Tb provides the sub-trees formed by the nodes B4.0, B4.1 and B6.0 (both of them having the parent node B0.0 whose snapshot matches the one of the graft node A0.0 in the snapshot tree Ta); in turn, the snapshot tree Tc provides the sub-tree formed by the nodes C6.1, C6.2 (having the parent node C6.0 whose snapshot matches the one of the graft node B6.0 once appended to the snapshot tree Ta).

Figure 2B:
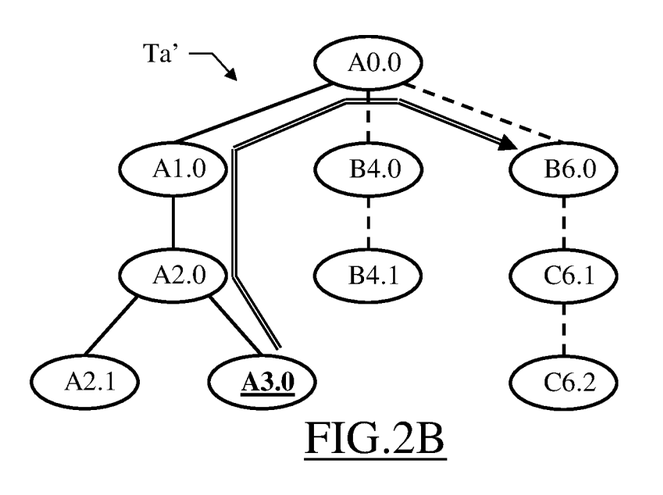

Therefore, as shown in the FIG. 2B, the snapshot tree of the virtual machine VMa so expanded (differentiated with the reference Ta') is obtained by appending one or more new nodes (denoted with the same references) corresponding to the sub-trees B4.0, B4.1 and B6.0 to the graft node A0.0 and corresponding to the sub-tree C6.1, C6.2 to the graft node B6.0, as indicated by the corresponding edges in dashed lines in the figure.

Any one of the snapshots represented by the nodes of the snapshot tree Ta' (comprising the shared ones of the other virtual machines Tb and Tc, referred to as donor virtual machines) may now be selected for application on the virtual machine VMa (referred to as exploiter virtual machine).

The above-mentioned solution allows sharing the snapshots among multiple virtual machines (and more generally any computing machines).

This avoids (or at least substantially reduces) the repetition of similar operations on the different computing machines (with a corresponding saving of time); moreover, this limits a sprawling of the snapshots on the different computing machines (with a corresponding saving of mass memory space).

The restoring on the exploiter computing machine of a selected (shared) snapshot from another donor computing machine is relatively fast. Particularly, this process generally does not require stopping the donor computing machine (since its selected snapshot is already available), thereby avoiding any unavailability period thereof. Moreover, this does not affect any previous snapshot of the exploiter computing machine (which remains available for next restoring anywhere).

All of the above dramatically simplifies the management of the evolution of the computing machines, in terms of their software programs and versions/patches thereof. Particularly, this is very useful in a software development environment, wherein the software developers of a software development team may move back and forth along all the snapshots (providing different versions of the software test environment) in a very simple and fast way; for example, a software developer may promptly move to a new version of the software developer environment that has already been installed by another software developer (who has taken a snapshot thereof).

In a specific implementation, when the snapshots of the descendent nodes are incremental, the restoring of the snapshot of the selected node (for example, B6.0) is performed by traversing the snapshot tree Ta' from a (last) node, highlighted in the figure, which represents a last snapshot of the virtual machine VMa (for example, A3.0), to the selected node B6.0. In detail, the snapshot of each node in the snapshot tree Ta' from the last node A3.0 to a common ancestor node between the last node A2.1 and the selected node B6.0 (i.e., A0.0) is restored on the virtual machine VMa; particularly, the snapshot of the last node A3.0 is restored (so as to remove any changes of the virtual machine VMa after its taking), and the snapshots of its ancestor nodes A2.0 and A1.0 are restored in succession (so as to remove the changes between each pair of them). At this point, the snapshot of each node in the snapshot tree Ta' from the common ancestor node A0.0 to the selected node B6.0 is restored on the virtual machine VMa; particularly, the snapshots of the common ancestor node A0.0 and the snapshot of its descendent node B6.0 are restored in succession (so as to apply the changes between them).

Figure 2C:
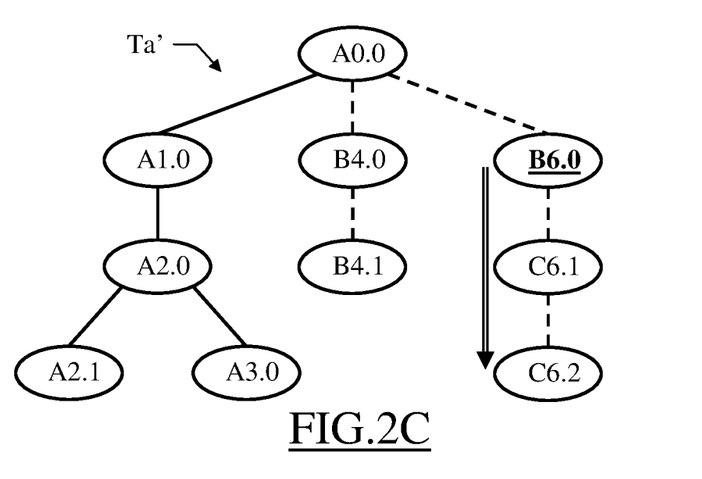

Moving to the FIG. 2C, the selected node B6.0 then becomes the new last node of the snapshot tree Ta' (again highlighted in the figure).

The same operations described above may be reiterated for restoring any other snapshot represented by the nodes of the snapshot tree Ta' on the virtual machine VMa (for example, the snapshot of the node C6.2).

In this case, the last node B6.0 is already the common ancestor node between it and the selected node C6.2, so that no snapshot of its ancestor nodes has to be restored on the virtual machine VMa. As above, the snapshot of each node in the snapshot tree Ta' from the common ancestor node B6.0 to the selected node C6.2 is restored on the virtual machine VMa; particularly, the snapshots of the common ancestor node B6.0 and the snapshots of its descendent nodes C6.1 and C6.2 are restored in succession.

Figure 2D:
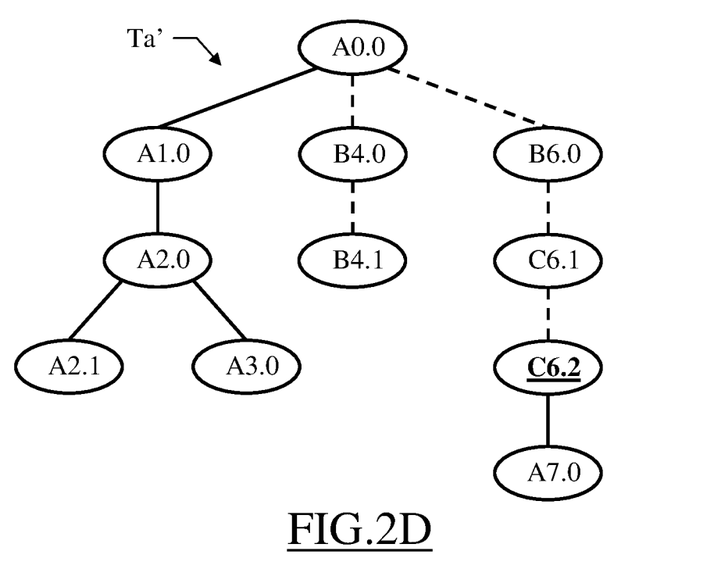

Moving to the FIG. 2D, the selected node C6.2 then becomes the new last node of the snapshot tree Ta' (again highlighted in the figure).

Any new snapshot may also be taken on the virtual machine VMa, in an incremental way with respect to the last snapshot (being either local or shared). For example, it is possible to upgrade the software development environment from the current version (6.2) to a new version 7.0, and then taking a corresponding new snapshot. The new snapshot is represented in the expanded tree Ta' by a new node A7.0 that is appended to the last node C6.2 (as indicated by the corresponding edge in solid line in the figure), with this new node A7.0 that then becomes the new last node of the snapshot tree Ta'.

This implementation reduces the amount of mass memory space that is required to store the snapshots of the descendent nodes (since only the representation of their differences is saved); moreover, it reduces the time required to restore the selected snapshot (since it only requires the removal and/or application of the corresponding differences).

Figure 3:
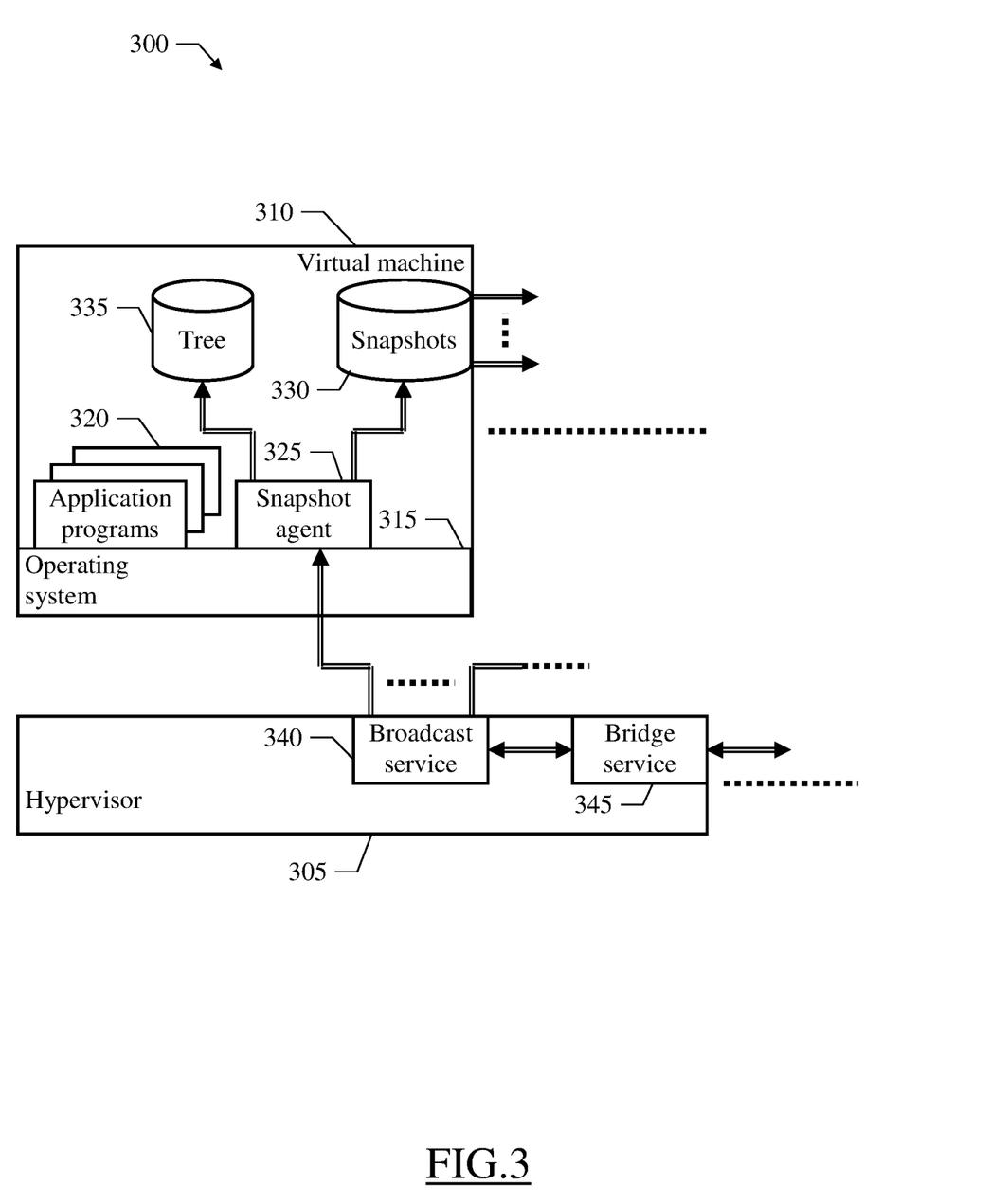
FIG. 3 shows the main software components that may be used to implement the solution according to an embodiment of the present disclosure.

With reference now to the FIG. 3, the main software components are shown that may be used to implement the solution according to an embodiment of the present disclosure.

These software components (programs and data) are denoted as a whole with the reference 300. The software components are typically stored in the mass memory and loaded (at least partially) into the working memory of one or more servers of the above-described computing system when the programs are running. The programs are initially installed onto the mass memory, for example, from removable storage devices or from the network. In this respect, each software component may represent a module, segment or portion of code, which comprises one or more executable instructions for implementing the specified logical function.

Particularly, each server comprises a hypervisor 305 directly running on a hardware structure thereof (for example, VMware by VMware Inc. or Xen by Citrix Systems Inc., trademarks thereof); the hypervisor 305 emulates a dedicated virtual hardware structure for each one of a plurality of virtual machines 310. Each virtual machine 310 in turn comprises a (host) operating system 315 (directly running on its virtual hardware structure); the operating system 315 defines a software platform on top of which one or more application programs 320 may run. Particularly, the virtual machine 310 runs a snapshot agent 325, which manages the snapshots of the virtual machine 310. For this purpose, the snapshot agent 325 controls a snapshot repository 330 that stores the (local) snapshots that have been taken on the virtual machine 310 over time; moreover, the snapshot agent 325 controls a tree file 335 that stores a representation of the snapshot tree of the virtual machine 310.

In the solution according to an embodiment of the present disclosure, the snapshot repository 330 of each virtual machine 310 is shared with the other virtual machines (not shown in the figure); for example, this result may be achieved by storing the snapshot repository 330 in a dedicated virtual disk, which is mounted in read-write mode by the corresponding virtual machine 310 and it may be mounted in read-mode only by each other virtual machines, or by exploiting a cluster service of the hypervisor 305 (for example, Microsoft Cluster Service (MSCS) by Microsoft Corp. or Symantec Veritas Cluster Server (VCS) by Symantec Corp., trademarks thereof).

Moreover, the snapshot agent 325 interacts with a broadcast service 340 of the hypervisor 305 for announcing the taking of every snapshot of the virtual machine 310 and any request of deleting one of its snapshots from the snapshot repository 330. The broadcast service 340 broadcasts these announcements to the other virtual machines (for example, on a dedicated communication channel or virtual network of the hypervisor 305). The broadcast service 340 also communicates with a bridge service 345 of the hypervisor 305 for exchanging the same announcements with the hypervisors of other servers (not shown in the figure).

Figure 4A:
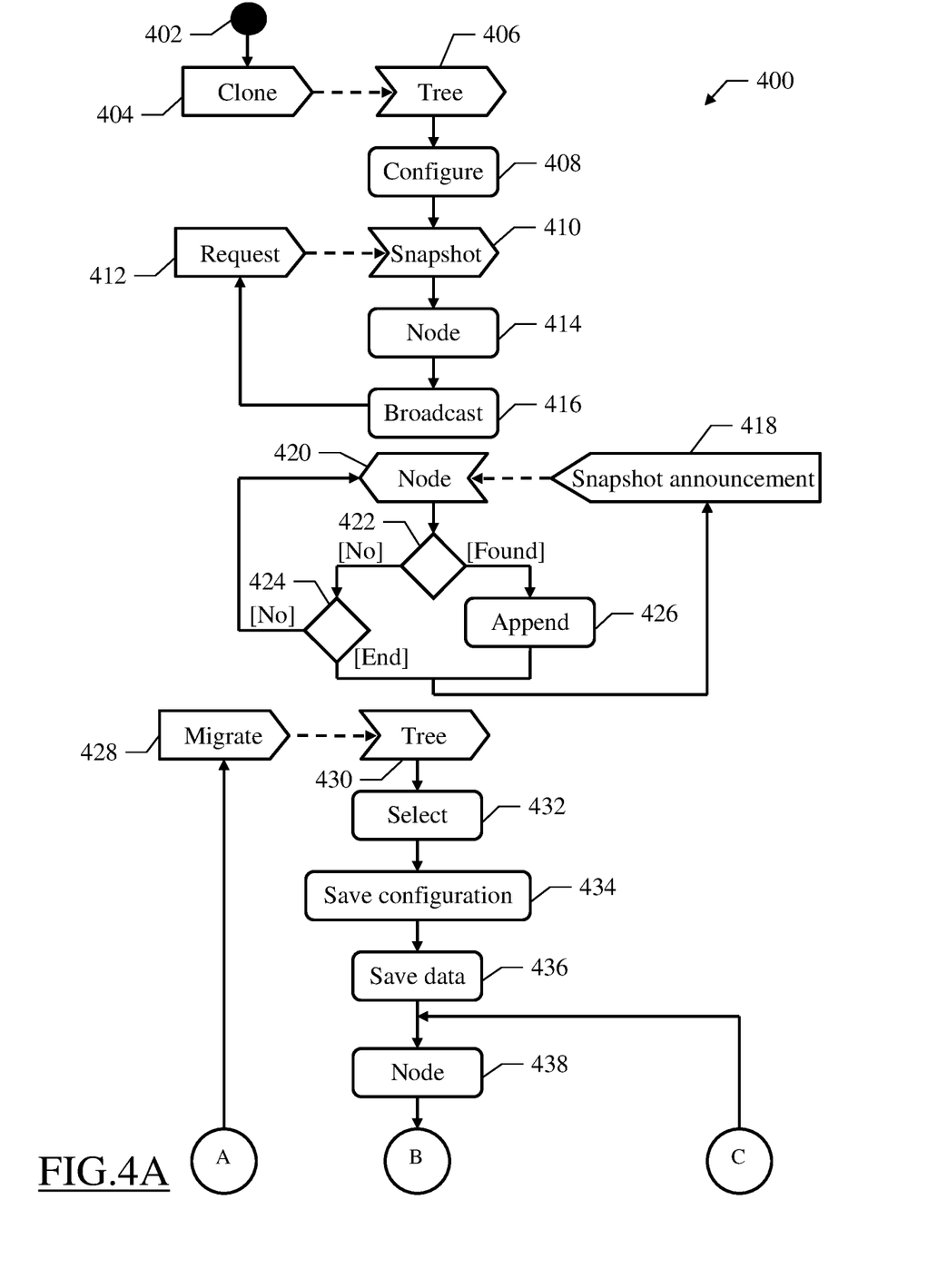
FIG. 4A-FIG. 4C show an activity diagram describing the flow of activities relating to an implementation of the solution according to an embodiment of the present disclosure.
Figure 4B:
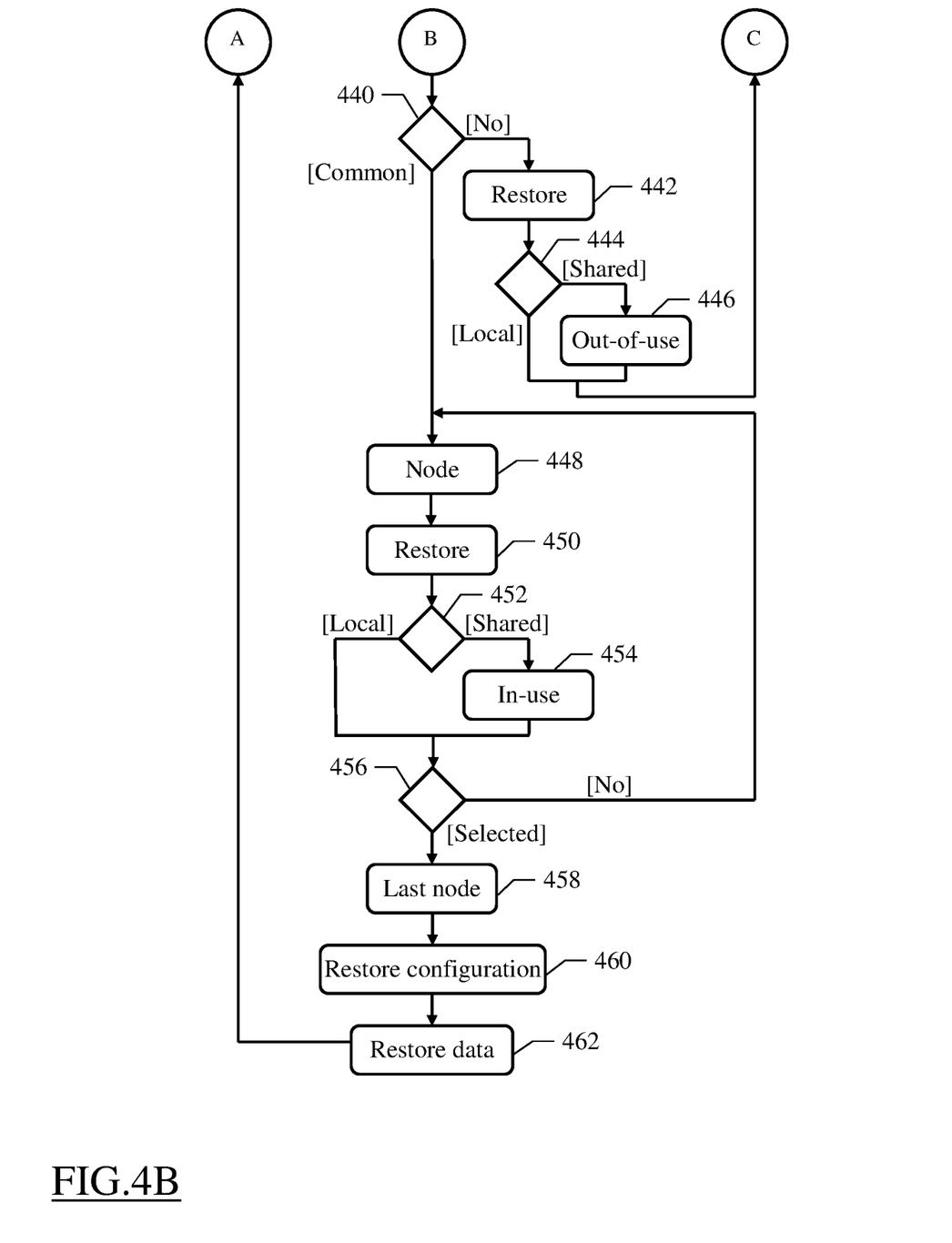
Figure 4C:
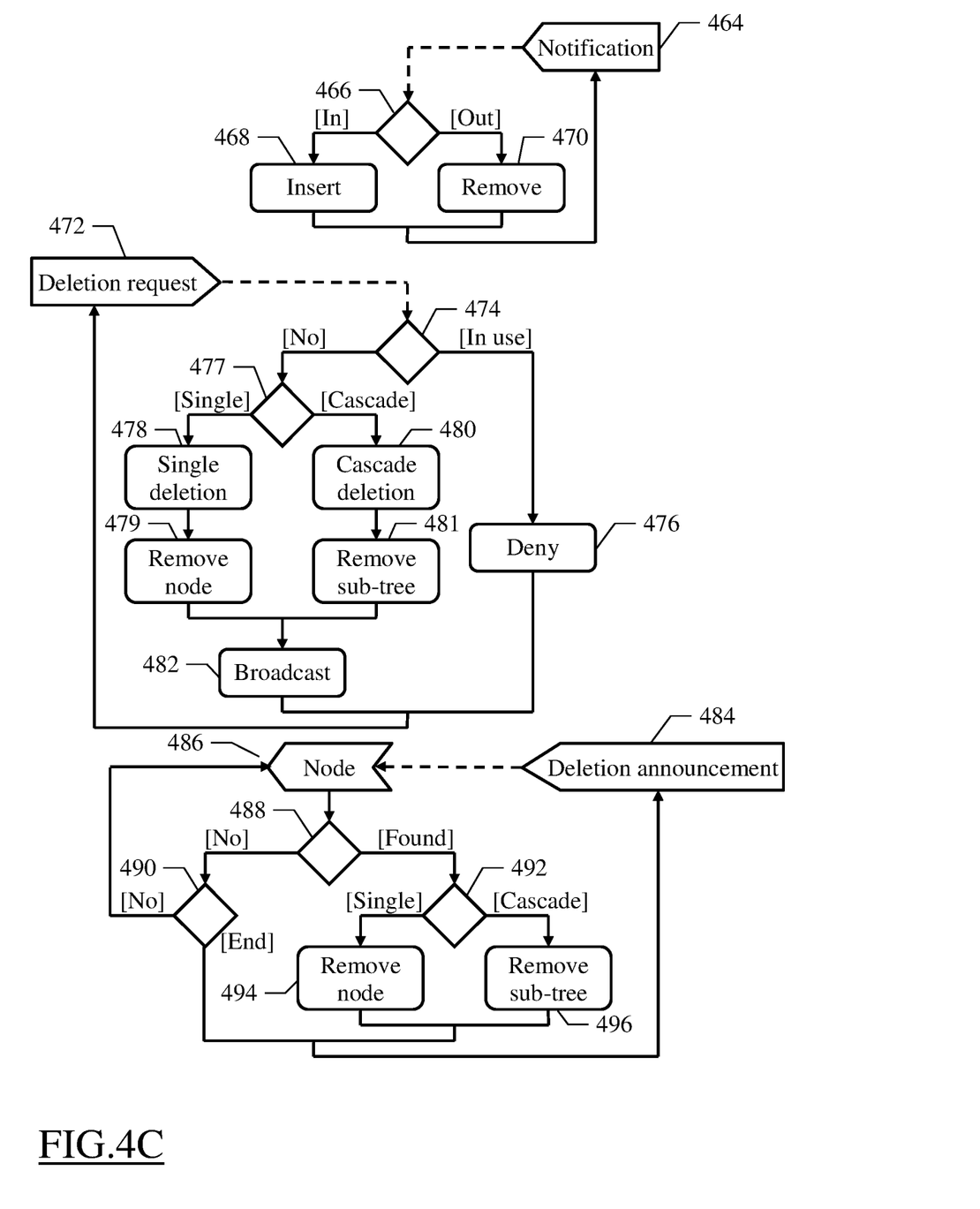

With reference now to the FIG. 4A-FIG. 4C, an activity diagram is shown describing the flow of activities relating to an implementation of the solution according to an embodiment of the present disclosure.

Particularly, the diagram represents an exemplary process that may be used to manage the snapshots of a specific virtual machine with a method 400. In this respect, each block may represent one or more executable instructions for implementing the specified logical function on the virtual machine.

The method 400 begins at the black start circle 402 and then passes to block 404 when the virtual machine is created by cloning it from an (original) snapshot of another (original) virtual machine. Continuing to block 406, a new snapshot tree of the virtual machine is created; the snapshot tree is initialized with the sole root node, which corresponds to the node of the original snapshot in the snapshot tree of the original virtual machine; at the same time, a last index indicative of the last node of the snapshot tree of the virtual machine is initialized so as to point to its root node. The virtual machine is then re-configured at block 408 for its correct operation (for example, by changing IP address and hostname) and/or for applying any desired customization (for example, user name, desktop appearance).

At this point, a new snapshot of the virtual machine may be taken at block 410 (so as to save a representation of the configurations applied after the cloning); the same point is also reached directly from block 412 when a corresponding request is submitted (for example, before and/or after a substantial upgrade of the virtual machine, such as for the installation of a new software program, for the migration to a new version of a software program already available or for the application of a service pack thereto). In any case, the new snapshot saves a representation of a current state of the virtual machine; for example, the new snapshot contains an indication of the configuration of the virtual machine, a content of its mass memory, a content of its working memory and/or its context (such as defined by a system registry). The new snapshot is incremental, and particularly of the copy-on-write type. In this case, the snapshot is taken by simply allocating a corresponding (sparse) snapshot file that is substantially empty at the beginning; whenever any piece of information defining the state of the virtual machine is to be updated, its value before the update (i.e., at the time of the new snapshot) is added to the snapshot file so as to preserve it. Therefore, the taking of the new snapshot is almost instantaneous; moreover, the new snapshot wastes very little mass memory space at the beginning (with its size that increases over time).

Continuing to block 414, a new node for the new snapshot is added to the snapshot tree. Particularly, the new node comprises a snapshot identifier and a snapshot pointer of the new snapshot; for example, the snapshot identifier is equal to a hash value of the snapshot file (within the snapshot repository) that stores the new snapshot, and the snapshot pointer is a fully qualified name of the snapshot file comprising an identifier of the virtual machine (such as its IP address) and a full path thereon. The new node also comprises a descriptive name (entered manually) and an indication of characteristic information of the new snapshot; examples of the characteristic information of the new snapshot are its software programs, their versions and levels (discovered automatically with any suitable inventory techniques). At the same time, the last index is updated so as to point to the new node. A corresponding snapshot announcement is broadcast at block 416 for the other virtual machines; the snapshot announcement comprises an indication of the new node and of its parent node; for example, the snapshot announcement comprises the descriptive name, the snapshot identifier, the snapshot pointer and the characteristic information of the new node, and the snapshot identifier of its parent node. The flow of activity then returns to the block 412 waiting for a further request of taking a new snapshot of the virtual machine.

Vice-versa, as soon as a snapshot announcement is received at block 418 from another virtual machine, the flow of activity passes to block 420. In this phase, the snapshot tree is scanned for searching a matching node whose snapshot has the same snapshot identifier as the one of the parent node of the snapshot announcement (meaning that they are the same); for this purpose, the nodes of the snapshot tree are traversed with any suitable search algorithm (for example, of the depth-first or breadth-first type), starting from a corresponding first current node (for example, the root node). The snapshot identifier of the current node is compared at block 422 with the snapshot identifier of the parent node of the snapshot announcement. If these two snapshot identifiers are different, a further test is made at block 424 to verify whether an end of the snapshot tree has been reached. If not, the flow of activity returns to the block 420 for processing a next node of the snapshot tree (according to the applied search algorithm). Referring back to the block 422, when the two snapshot identifiers are the same, meaning that the matching node has been found, the new node is appended to the matching node (as its child node) at block 426. The flow of activity then returns to the block 418 waiting for the receipt of a further snapshot announcement; the same point is also reached directly from the block 424 when the end of the snapshot tree has been reached without finding the matching node (so that the snapshot tree remains unaffected since the new snapshot of the snapshot announcement is not adapted to be applied on the virtual machine). In this way, the snapshot tree is expanded with a peer-to-peer approach, so as to limit any overhead of the hypervisor.

In a completely independent way, the flow of activity passes from block 428 to block 430 when a request of migrating the virtual machine is submitted. In response thereto, a graphical representation of the snapshot tree is displayed. Each node is represented with a graphical symbol comprising its descriptive name, with the possibility of displaying the corresponding characteristic information in a pop-up window (for example, when a pointer of a mouse passes over the graphical symbol). As a further improvement, a compatibility index is calculated for each node. The compatibility index is calculated according to a comparison between the characteristic information of the snapshot of the node and corresponding characteristic information of a current state of the virtual machine (discovered at run-time as above), so as to provide a measure of their compatibility; for example, it is possible to assign a score to some key characteristics (such as operating system type and version, installed application programs), and then sum the scores of the matching characteristics. The node is displayed with different visual cues for corresponding ranges of its compatibility index (for example, green for high values, yellow for medium values and red for low values). All of the above facilitates the choice of the snapshot to be restored on the virtual machine (according to its characteristics and compatibility with the current state of the virtual machine).

Continuing to block 432, one of the nodes of the snapshot tree (and then its snapshot) is selected. Configuration information indicative of a current configuration of the virtual machine is saved at block 434; for example, the configuration information comprises the values of one or more pre-defined configuration parameters indicated in a corresponding template (such as IP address, hostname, user name, desktop appearance). Likewise, selected current data of the virtual machine is saved at block 436; for example, the data is defined by pre-defined folders indicated in a corresponding list (such as a user folder and data folders of application programs).

A loop is then performed for restoring the snapshot of each (out-of-use) node in a path of the snapshot tree from the last node to the common ancestor node excluded, which path is traversed for each current node at block 438, starting from the last node. A test is made at block 440 to verify whether the common ancestor node has been reached (as identified to have the selected node as well as a descendent node thereof). If not, the snapshot of the current node is restored on the virtual machine at block 442; particularly, when the snapshot is of the copy-on-write type, it is enough to copy back the pieces of information saved in the snapshot file (i.e., updated after the taking of the current snapshot). The type of snapshot of the current node is then determined at block 444. If the snapshot of the current node is shared from another (donor) virtual machine, an out-of-use notification comprising an indication of the current node (for example, its snapshot identifier) is sent at block 446 to the donor virtual machine. The flow of activity then returns to the block 438 for processing a next ancestor node in the path from the last node to the common ancestor node (i.e., the parent node of the current node); the same point is also reached directly from the block 444 when the snapshot of the current node is local. Referring back to the block 440, as soon as the common ancestor node has been reached the loop is exit by descending into block 448.

Another loop is now performed for restoring the snapshot of each (in-use) node in a path of the snapshot tree from the common ancestor node to the selected node, which path is traversed for each current node, starting from the common ancestor node. Continuing to block 450, the snapshot of the current node is restored on the virtual machine. The type of snapshot of the current node is then determined at block 452. If the snapshot of the current node is shared from another (donor) virtual machine, an in-use notification comprising an indication of the current node (for example, its snapshot identifier) is sent at block 454 to the donor virtual machine. The flow of activity then proceeds to block 456; the same point is also reached directly from the block 452 when the snapshot of the current node is local. A test is now made to verify whether the selected node has been reached. If not, the flow of activity returns to the block 448 for processing a next descendent node in the path from the common ancestor node to the selected node (i.e., the corresponding child node of the current node). Referring back to the block 456, once the selected node has been reached the loop is exit by descending into block 458.

At this point, the last index is updated so as to point to the selected node (to indicate that the selected node has become the last node now). The virtual machine is re-configured at block 460 according to the saved configuration information (so as to restore the corresponding configuration for its correct operation and any customization). Likewise, the saved data is restored at block 462 (so as to avoid any loss thereof). For example, the saving and the restoring of the configuration information and of the data may be performed with any suitable migration tool (such as USMT by Microsoft Corp. trademarks thereof). The flow of activity then returns to the block 428 waiting for a next request of migration of the virtual machine.

Vice-versa, as soon as an (out-of-use or in-use) notification is received at block 464 from another (exploiter) virtual machine, the flow of activity passes to block 466. In this phase, a usage table indicative of the usage of the local snapshots of the virtual machine by the other virtual machines is updated accordingly; particularly, the usage table indicates all the exploiter virtual machines that are using each local snapshot of the virtual machine (for example, with an entry for each local snapshot that lists the identifiers of the corresponding exploiter virtual machines). Particularly, the flow of activity branches according to the type of notification. In case of in-use notification this means that, in the snapshot tree of the exploiter virtual machine, the node of the corresponding snapshot is now comprised between the last node and the root node (so that it may be required for migrating the exploiter virtual machine to a different snapshot); therefore, the identifier of the exploiter virtual machine (for example, extracted from a source field of the in-use notification) is added to the entry of the snapshot of the in-use notification at block 468. Conversely, in case of out-of-use notification this means that, in the snapshot tree of the exploiter virtual machine, the node of the corresponding snapshot is not comprised any longer between the last node and the root node; therefore, the identifier of the exploiter virtual machine is removed from the entry of the snapshot of the out-of-use notification at block 470. In both cases, the flow of activity returns to the block 464 waiting for the receipt of a further (out-of-use or in-use) notification.

With reference now to block 472, a request of deleting an (old) local snapshot of the virtual machine as identified by a corresponding (old) node of the snapshot tree may be submitted; for example, this allows cleaning-up the mass memory when the old snapshot is likely not to be used any longer. In response thereto, the entry of the old node in the usage table is verified at block 474. If the entry of the old node is not empty (meaning that the old snapshot is currently in use on one or more other virtual machines), the request of deleting the old snapshot is denied at block 476. Conversely, the request of deleting the old snapshot is allowed at block 477. At this point, the flow of activity branches according to a deletion mode (for example, selected at run-time by corresponding values of a dedicated parameter or pre-selected according to a configuration of the snapshot agent). Particularly, in a single mode the old snapshot is merged with the snapshot of any child node thereof at block 478. For this purpose, if the old node is not the root node, any piece of information comprised in the old snapshot (with no newer version thereof comprised in the snapshot of the child node) is added to the snapshot of the child node; instead, if the old node is the root node, one of its child nodes becomes the new root node and the corresponding full snapshot is generated, and the incremental snapshot with respect thereto of any other child node is generated. The snapshot of the old node is then deleted. The old node is removed from the snapshot tree at block 479 (with any child node of the old node that is appended to the parent node of the old node). Referring back to the block 477, in a cascade mode the old snapshot and the snapshot of any descendent node of the old node in the snapshot tree is deleted at block 480. The sub-tree defined in the snapshot tree by the old node with all its descendent nodes is removed therefrom at block 481. The flow of activity now merges at block 482 from either the block 479 or the block 481. In both cases, a deletion announcement comprising an indication of the old node (for example, its snapshot identifier) and an indication of the deletion mode (if multiple ones are supported) is broadcast for the other virtual machines. The flow of activity then returns to the block 472, from either the block 476 or the block 482, waiting for a further request of deleting an old snapshot.

Vice-versa, as soon as a deletion announcement is received at block 484 from another virtual machine, the flow of activity passes to block 486. In this phase, the snapshot tree is scanned for searching the old node of the deletion announcement (i.e., having the same snapshot identifier); for this purpose, the nodes of the snapshot tree are traversed with any suitable search algorithm (either the same or different from the one mentioned above), starting from a corresponding first current node (for example, again the root node). The snapshot identifier of the current node is compared at block 488 with the snapshot identifier of the old node of the deletion announcement. If these two snapshot identifiers are different, a further test is made at block 490 to verify whether an end of the snapshot tree has been reached. If not, the flow of activity returns to the block 486 for processing a next node of the snapshot tree (according to the applied search algorithm). Referring back to the block 488, when the two snapshot identifiers are the same, meaning that the old node has been found, the flow of activity branches at block 492 according to the deletion mode (as indicated in the deletion announcement, when necessary). Particularly, in the single mode the old node only is removed from the snapshot tree at block 494. Conversely, in the cascade mode the sub-tree defined in the snapshot tree by the old node with all its descendent nodes is removed therefrom at block 496. In both cases, the flow of activity then returns to the block 484 (from either the block 494 or the block 496) waiting for the receipt of a further deletion announcement; the same point is also reached directly from the block 490 when the end of the snapshot tree has been reached without finding the old node. As above, the snapshot tree is again reduced with a peer-to-peer approach, so as to limit any overhead of the hypervisor.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for managing each one of a plurality of computing machines. The method comprises the following steps. One or more snapshots of the computing machine or part thereof are taken; the snapshots are organized in a snapshot tree of nodes representing the snapshots according to a dependency thereof. The snapshot tree of the computing machine is expanded according to each sub-tree of the snapshot tree of each other computing machine, which has the snapshot of a parent node of the sub-tree matching a graft node of the snapshot tree of the computing machine; the sub-tree is appended to the graft node. A snapshot of the other computing machines represented by a selected node of the snapshot tree of the computing machine is selected. The selected snapshot is restored on the computing machine.

However, the computing machines may be of any type and in any number, the snapshots may be of any type and in any number, the snapshots may be organized in the snapshot tree according to any dependency thereof, the snapshot tree may be expanded in any way, and the snapshot of the selected node may be restored in any way (see below). Moreover, each snapshot may relate to the whole computing machine or only to a part thereof (for example, one or more selected software applications, such as software development tools). The snapshots of the different computing machines may be matched in any way (even manually); for example, two snapshots may be matched when their computing machines have been created from a same software image, and they have the same characteristics, such as operating system, application programs and version/level thereof. The selection of the snapshot to be restored may be performed in any way; for example, the compatibility index of the nodes may be calculated with any other formula and/or according to different, additional or alternative characteristics of the corresponding snapshots, or it may be omitted at all.

In an embodiment, the snapshot of each descendent node different from a root node is incremental with respect to the snapshot of a parent node of the descendent node. Said restoring the selected snapshot on the computing machine comprises the following steps. The snapshot of each out-of-use node of the snapshot tree of the computing machine, from a last node representing a last snapshot to a common ancestor node between the last node and the selected node (excluded), is restored; the snapshot of each in-use node of the snapshot tree of the computing machine, from the common ancestor node to the selected node, is then restored.

However, the snapshots may be of other types; for example, the snapshots may be multilevel incremental, differential (with respect to a previous full snapshot) or even all full; the snapshots may be organized in the snapshot tree according to other dependencies thereof (for example, based on the versions of the corresponding software development environment). As a consequence, the selected snapshot may be restored in other ways (down to restore the selected snapshot directly when it is full).

In an embodiment, said taking one or more snapshots of the computing machine or part thereof comprises the following steps (in response to the taking of each new snapshot of the computing machine). A new node representing the new snapshot is appended to the last node in the snapshot tree of the computing machine. A snapshot announcement (comprising an indication of the new node and of a parent node thereof in the snapshot tree of the computing machine) is broadcast to the other computing machines. Said expanding the snapshot tree comprises the following steps. Each snapshot announcement is received from the other computing machines. A matching node of the snapshot tree of the computing machine, whose snapshot matches the snapshot of the parent node of the received snapshot announcement, is searched. A node corresponding to the new node of the received snapshot announcement is appended to the matching node in response to a finding of the matching node.

However, the taking of each snapshot may be announced to the other computing machines in any way (for example, by publishing it in a shared memory space). Moreover, the matching of the nodes may be determined in any way; for example, it is possible to compare any other identifiers of the snapshots (such as indicating the computing machines where they have been taken and their time stamps) or to compare their characteristics directly. The node to be appended may be created from the characteristics (or part thereof) of the new node of the received snapshot announcement, or it may be exactly equal thereto. In any case, nothing prevents expanding the snapshot tree at any time (for example, in a pull mode when it has to be used), by comparing the whole snapshot tree of each other computing machine with the one of the computing machine, so as to append all the relevant sub-trees at the time; moreover, the possibility of managing the sharing of the snapshots in a centralized way is not excluded.

In an embodiment, the method further comprises cloning the computing machine from an original snapshot of an original computing machine, and initializing the snapshot tree of the computing machine with the sole root node corresponding to the node representing the original snapshot in the snapshot tree of the original computing machine.

However, as above the root node may be created from the characteristics (or part thereof) of the node of the original snapshot, or it may be exactly equal thereto. In any case, the computing machine may be created in any way (for example, by instantiating it from a gold software image or even by installing the required software programs manually).

In an embodiment, the method further comprises receiving a request of deleting an old snapshot represented by an old node of the computing machine. The deletion of the old snapshot is conditioned. Particularly, the deletion of the old snapshot is denied when the old node is comprised in a path of the snapshot tree of at least one of the other computing machines from the last node to the root node; otherwise, the old snapshot is deleted and the old node is removed from the snapshot tree of the computing machine.

However, the deletion of the old snapshot may be conditioned in any way (for example, according to a time elapsed from its last use); moreover, the deletion may involve the old snapshot only or the old snapshot with the snapshot of each node dependent thereon (either always or selectively with a possible default mode). In any case, an implementation is not excluded wherein the snapshots may always be deleted upon request or automatically according to a pre-defined policy (such when a maximum size of the snapshot tree has been reached).

In an embodiment, said conditioning the deletion of the old snapshot comprises, in response to the deletion of the old snapshot, broadcasting a deletion announcement (comprising an indication of the old node) to the other computing machines. The method further comprises the following steps. Each deletion announcement is received from the other computing machines. A further matching node of the snapshot tree of the computing machine, whose snapshot matches the snapshot of the old node of the received deletion announcement, is searched. The further matching node is removed from the snapshot tree of the computing machine in response to a finding of the further matching node.

However, as above the deletion of each old snapshot may be announced to the other computing machines in any way, and the matching of the nodes may be determined in any way. In any case, nothing prevents reducing the snapshot tree at any time (for example, in pull mode only when it has to be used), for one or more old snapshots at the time; moreover, the possibility of managing this operation as well in a centralized way is not excluded.

In an embodiment, the method further comprises the following steps. An out-of-use notification comprising an indication of each out-of-use node (whose snapshot has been taken on one of the other computing machines) is sent to the corresponding other computing machine. An in-use notification comprising an indication of each in-use node (whose snapshot has been taken on one of the other computing machines) is sent to the corresponding other computing machine. Each out-of-use notification and each in-use notification is received from the other computing machines. A usage data structure, indicative of a use of the snapshots of the computing machine by the other computing machines, is updated according to each received out-of-use notification and in-use notification. Said conditioning the deletion of the old snapshot is based on the usage data structure.

However, as above the out-of-use and in-use nodes may be identified in any way. Moreover, the usage data structure may be of any type (for example, defined by a dedicated field of each node of the snapshot tree), and it may be updated at any time (for example, only when an old snapshot has to be deleted). In any case, nothing prevents using a centralized usage data structure for all the snapshots.

In an embodiment, the method further comprises saving configuration information indicative of a current configuration of the computing machine before said restoring the selected snapshot on the computing machine, and re-configuring the computing machine according to the configuration information after said restoring the selected snapshot on the computing machine.

However, the configuration information may comprise the values of different, additional, alternative parameters, or any other piece of information (such as port numbers, e-mail addresses, application program customizations); moreover, the configuration information may be saved in any way (for example, continually over time at any change thereof). In any case, this feature may be implemented even independently of the above-described solution (for example, manually).

In an embodiment, the method further comprises saving selected data of the computing machine before said restoring the selected snapshot on the computing machine, and restoring the selected data after said restoring the selected snapshot on the computing machine.

However, the selected data may be of any type (for example, files, partitions, disks); moreover, the data may be saved in any way (for example, continually mirroring it). In any case, this feature may be implemented even independently of the above-described solution (for example, manually).

In an embodiment, each computing machine is a virtual computing machine.

However, the virtual machines may be implemented in any way (for example, by a virtualization layer running on top of a host operating system). In any case, the application of the same solution to physical machines or a combination of virtual and physical machines (for whatever application, for example, of the office automation type) is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program configured for causing a computing system to perform the steps of the above-described method when the computer program is executed on the computing system.

A further embodiment provides a computer program product comprising a non-transitory computer readable medium embodying a computer program, the computer program being loadable into a working memory of a computing system thereby configuring the computing system to perform the same method.

However, the above-described solution may be implemented as a stand-alone software program, as a plug-in for a pre-existing software program (for example, a snapshot tool), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the above-described method.

However, the method may also be carried out on a system based on a different architecture (for example, a local, wide area, global, cellular or satellite network), and exploiting any type of (wired and/or wireless) connections. However, its implementation on a stand-alone computing system is not excluded. Each computing machine may have another structure or may comprise similar elements; moreover, it is possible to replace the computing machine with any code execution entity, either based on a physical machine or a virtual machine (such a smart-phone, a tablet, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed:

1. A method for managing each of a plurality of computing machines comprising a computing machine and at least one other computing machine, the method comprising:
    taking one or more snapshots of the computing machine or part thereof, the snapshots being organized in a snapshot tree of nodes representing the snapshots according to a dependency thereof;
    expanding the snapshot tree of the computing machine according to each sub-tree of a snapshot tree of each other computing machine having the snapshot of a parent node of the sub-tree matching a graft node of the snapshot tree of the computing machine, the sub-tree being appended to the graft node;
    selecting a snapshot of the other computing machines represented by a selected node of the snapshot tree of the computing machine; and
    restoring the selected snapshot on the computing machine, wherein a snapshot of each descendent node different from a root node is incremental with respect to a snapshot of a parent node of the descendent node, said restoring the selected snapshot on the computing machine comprising:
    restoring a snapshot of each out-of-use node of the snapshot tree of the computing machine from a last node representing a last snapshot to a common ancestor node between the last node and the selected node excluded; and
    restoring a snapshot of each in-use node of the snapshot tree of the computing machine from the common ancestor node to the selected node.

2. The method according to claim 1, further comprising:
    cloning the computing machine from an original snapshot of an original computing machine; and
    initializing the snapshot tree of the computing machine with a node corresponding to the node representing the original snapshot in the snapshot tree of the original computing machine.

3. The method according to claim 1, further comprising:
    receiving a request to delete an old snapshot represented by an old node of the snapshot tree; and
    conditioning the deletion of the old snapshot by denying the deletion of the old snapshot when the old node is included in a path of the snapshot tree of at least one of the other computing machines from the last node to the root node, or deleting the old snapshot and removing the old node from the snapshot tree of the computing machine otherwise.

4. The method according to claim 3, wherein said conditioning the deletion of the old snapshot comprises, in response to the deletion of the old snapshot, broadcasting a deletion announcement comprising an indication of the old node to the other computing machines, wherein the method further comprising:
    receiving each deletion announcement from the other computing machines;
    searching for a further matching node of the snapshot tree of the computing machine whose snapshot matches the snapshot of the old node of the received deletion announcement; and
    removing the further matching node from the snapshot tree of the computing machine in response to a finding of the further matching node.

5. The method according to claim 4, further comprising:
    sending an out-of-use notification comprising an indication of each out-of-use node whose snapshot has been taken on one of the other computing machines to the corresponding other computing machine;
    sending an in-use notification comprising an indication of each in-use node whose snapshot has been taken on one of the other computing machines to the corresponding other computing machine;
    receiving each out-of-use notification and each in-use notification from the other computing machines; and
    updating a usage data structure indicative of a use of the snapshots of the computing machine by the other computing machines according to each received outof-use notification and in-use notification, said conditioning the deletion of the old snapshot being based on the usage data structure.

6. The method according to claim 1, further comprising:
saving configuration information indicative of a current configuration of the computing machine before said restoring the selected snapshot on the computing machine; and
re-configuring the computing machine according to the configuration information after said restoring the selected snapshot on the computing machine.

7. The method according to claim 1, further comprising:
saving selected data of the computing machine before said restoring the selected snapshot on the computing machine; and
restoring the selected data after said restoring the selected snapshot on the computing machine.

8. The method according to claim 1, wherein each computing machine is a virtual computing machine.

9. A computer program product comprising a non-transitory computer readable medium embodying a computer program, the computer program being loadable into a working memory of a computing system to configure the computing system to perform the method of claim 1.

10. The method of claim 1, further comprising:
responsive to a request to migrate the computing machine, displaying a graphical representation of the snapshot tree that includes a representation of a compatibility index for each node of the snapshot tree that is displayed.

11. The method of claim 1, further comprising:
responsive to receiving a use notification from another computing machine, updating a usage table indicative of usage of local snapshots of the computing device by the other computing devices.

12. A system comprising a data processor coupled to a memory having program code stored therein that is configured for performing a method for managing each of a plurality of computing machines comprising a computing machine and at least one other computing machine, the method comprising:
taking one or more snapshots of the computing machine or part thereof, the snapshots being organized in a snapshot tree of nodes representing the snapshots according to a dependency thereof;
expanding the snapshot tree of the computing machine according to each sub-tree of a snapshot tree of each other computing machine having the snapshot of a parent node of the sub-tree matching a graft node of the snapshot tree of the computing machine, the sub-tree being appended to the graft node;
selecting a snapshot of the other computing machines represented by a selected node of the snapshot tree of the computing machine; and
restoring the selected snapshot of the other computing machines represented by the selected node on the computing machine, wherein a snapshot of each descendent node different from a root node is incremental with respect to a snapshot of a parent node of the descendent node, said restoring the selected snapshot on the computing machine comprising:
restoring a snapshot of each out-of-use node of the snapshot tree of the computing machine from a last node representing a last snapshot to a common ancestor node between the last node and the selected node excluded; and
restoring a snapshot of each in-use node of the snapshot tree of the computing machine from the common ancestor node to the selected node.

13. The system according to claim 12, further comprising:
cloning the computing machine from an original snapshot of an original computing machine; and
initializing the snapshot tree of the computing machine with a node corresponding to the node representing the original snapshot in the snapshot tree of the original computing machine.

14. The system according to claim 12, further comprising:
receiving a request to delete an old snapshot represented by an old node of the snapshot tree; and
conditioning the deletion of the old snapshot by denying the deletion of the old snapshot when the old node is included in a path of the snapshot tree of at least one of the other computing machines from the last node to the root node, or deleting the old snapshot and removing the old node from the snapshot tree of the computing machine otherwise.

* * * * *